Patented Oct. 2, 1934

1,975,465

UNITED STATES PATENT OFFICE 1,975,465

AZODYESTUFFS

William Edward Kemmerich, Nyack, N. Y.

No Drawing. Application October 17, 1931,
Serial No. 569,537

6 Claims. (Cl. 260—95)

The invention relates to new azo dyestuffs which can be obtained by combining any diazo compound with a 2'-aminodiphenylide of 2-3-hydroxy-naphthoic acid. These dyestuffs correspond to the general formula:

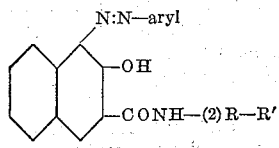

where R and R' may be the same or different radicles as well as substituted radicles, having halogen, nitro-, hydroxy-, methoxy-, ethoxy-, methyl-, ethyl-, and phenyl groups.

The simplest representative of this class of azo dyestuffs is the 2'-amino-diphenylide of 2-3-hydroxy-naphthoic acid combined with a diazocompound, having the following constitution:

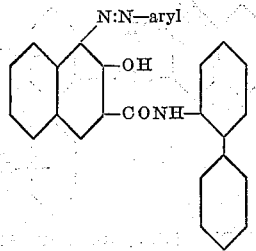

The dyestuffs can be used for the production of pigment colors of excellent fastness, and give when produced on the fibre from a yellowish orange to red to blue and black shades of great intensity and excellent fastness to light, soaping and chlorine. The 2 - 3 hydroxy-naphthoyl - 2' - aminodiphenylides and substituted 2-3-hydroxy-naphthoyl-2'-aminodiphenylides have when dissolved in an alkali a great affinity to the cotton fibre, so that the developed dyestuff shows a very good fastness to rubbing. It is therefore obvious that these new dyestuffs represent a very valuable addition in this class of azo dyestuffs.

The 2-3 hydroxynaphthoyl-2'-aminodiphenylides may be prepared according to the process described in U. S. Patent 1,101,111 by allowing a 2'-aminodiphenyl or a substituted 2'-aminodiphenyl to react on 2-3-hydroxynaphthoic acid in the presence of a dehydrating agent, or by forming first the chloride of 2-3-hydroxynaphthoic acid and bringing this product in contact with a 2'-aminodiphenyl or a substituted 2'-aminodiphenyl.

The so obtained 2'-aminodiphenylide of 2-3-hydroxynaphthoic acid for instance crystallizes from toluene in the form of small sand colored crystals having a melting point of about 170° centigrade.

To further illustrate my invention the following examples are given, the parts being by weight, but it is understood that my invention is not limited to the particular products mentioned or to the reaction conditions given therein.

Example 1

A diazo solution prepared in the usual manner from 138 parts of ortho-nitraniline is run under continuous stirring into 340 parts of 2-3-hydroxy-naphthoyl-2'-aminodiphenyl dissolved in diluted caustic soda solution containing sufficient sodium acetate to counteract the excess mineral acid of the diazo solution. A bright yellowish orange is formed as a flaky precipitate, which soon settles. It is filtered and washed. The pigment dyestuff so obtained may be used as such or it may be transformed into its metal lakes, such as the chromium-, tungsten-, aluminum- or other lakes. The product corresponds probably to the following formula:

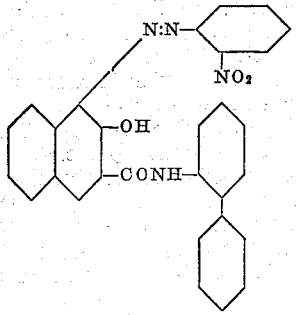

The same color may also be produced on the fibre in the following way:

Example 2

Cotton material well wetted out is impregnated with 5 grams of 2-3-hydroxynaphthoyl-2'-aminodiphenyl dissolved in 15 cc. of 33% caustic soda solution, 20 cc. of Turkey red oil, 5 cc. ethyl alcohol and made up to 1000 cc. with hot water. The material is treated with this solution for about 30 minutes, then wrung out well and developed in the following diazo solution.

3.75 grams of ortho-nitro-aniline are diazotized in the usual manner and the free mineral acid neutralized with sufficient sodium acetate; this solution is then diluted with cold water to the desired volume after 25 g. of sodium chloride have been added.

A very yellowish bright orange is so obtained on the fibre of excellent general fastness properties. Hot soaping after rinsing increases the brilliancy of the shade.

*Example 3*

The impregnation of the cotton material is carried out as in Example 2 except that instead of 5 g. 2-3-hydroxynaphthoyl-2'-aminodiphenyl, 6 g. of 2-3-hydroxynaphthoyl-2'-amino-dichlorodiphenyl are used.

The developing solution is prepared as follows:

5 g. meta-nitro-ortho-anisidine $$(NH_2:OCH_3:NO_2=1:2:5)$$

are diazotized in the usual manner and the diazo solution is neutralized with sodium acetate and filled up with cold water to the desired volume. The impregnated material is developed in this bath for a short time, then rinsed well in cold water, soaped in boiling hot olive oil soap solution and rinsed again.

A brilliant scarlet red is obtained with excellent fastness properties.

The dyestuff has probably the following formula, wherein the definite position of the two chlorin atoms is not known:

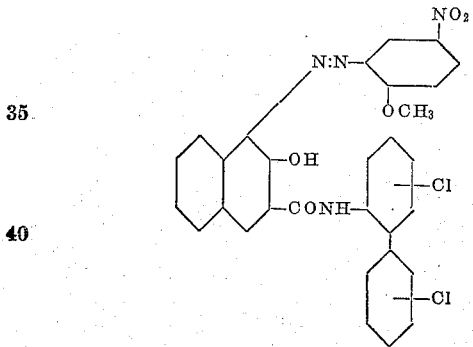

The 2-3-hydroxynaphthoyl-2-aminodiphenyls and their substituted products may also be used for textile printing. This can be done by first padding the material with a solution of these products in caustic soda and then printing the developing diazo solution on the dried material with the aid of a printing paste.

It is further possible to combine the 2-3-hydroxynaphthoyl-2'-aminodiphenyl with the nitrosamine salts of diazotizable aminobodies in an alkaline solution and a printing paste and to develop the colors with the aid of an acid after drying.

The following table gives the color of a number of dyestuffs according to my invention:

It has been found that the dyestuffs derived from the 2-3-hydroxynaphthoyl-2'-aminodiphenyl and from substituted 2-3-hydroxynaphthoyl-2'-aminodiphenyls can also be advantageously produced on silk, viscose, cuprammonium silk and cellulose acetate silk.

Now what I claim and desire to secure by Letters Patent is the following:

1. As compounds, azo dyestuffs corresponding to the general formula:

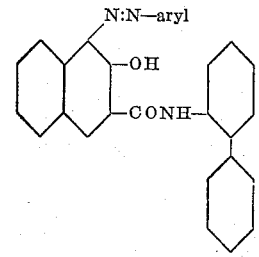

where aryl means a radicle of a diazotized aromatic amine, having hydrogen, halogen nitro-, hydroxy-, methoxy-, ethoxy-, methyl-, ethyl-, phenyl-groups in one or more positions, which compounds form in a dry state orange-red to blueblack powders, which are insoluble in water and are therefore very suitable for the production on textile fibres yielding colors of excellent fastness.

2. Process for manufacturing new azo dyestuffs which process comprises combining any aromatic diazo compound with a 2-3-hydroxy-naphthoyl-2'-aminodiphenyl.

3. Fiber dyed with the dyestuffs as claimed in claim 1.

4. Azo dyestuffs corresponding to the general formula:

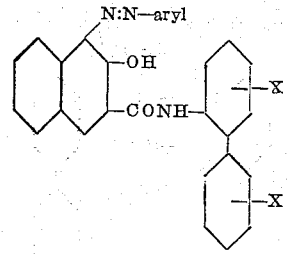

where X may be hydrogen, halogen, or one or more of the following groups: $OH$, $OCH_3$, $OC_2H_5$, $CH_3$, $C_2H_5$, $C_6H_5$, $NO_2$.

5. Process for manufacturing new azo dyestuffs which process comprises combining any aromatic diazo compound with 2-3-hydroxy-naphthoyl-2'-aminodiphenyl, having a substituted diphenyl group as enumerated in claim 4.

6. Fiber dyed with the dyestuffs as claimed in claim 4.

WILLIAM EDWARD KEMMERICH.

| Diazo compound of— | Combined with— | Shade |
|---|---|---|
| Ortho-nitraniline | 2-3-hydroxynaphthoyl-2'-aminodiphenyl | Yellowish orange. |
| 2-5-dichloraniline | do | Orange. |
| 5-nitro-1-2-toluidine | do | Yellowish red. |
| 2-aminodiphenyl | do | Bright red. |
| Para-nitraniline | do | Bluish red. |
| 3-amino-4-cresol methylether | do | Bluish Bordeaux. |
| Dimethyl-para-phenylene-diamine | do | Violet. |
| 1-amino-2-methoxybenzene-azo-1-naphthylamine | do | Blue-black. |
| Saffranine | do | Bright-blue. |
| 1-naphthylamine | do | Bordeaux. |
| Ortho-chloranilne | 2-3-hydroxynaphthoyl-2'-aminodichlordiphenyl | Orange. |
| Ortho-dianisidine | do | Blue. |
| 4-amino-diphenyl | do | Red. |